United States Patent [19]

Doty

[11] 4,340,630
[45] Jul. 20, 1982

[54] LOW CONDUCTIVITY GAS SEALED BUILDING INSULATION

[76] Inventor: Francis D. Doty, 1440 Bonner Ave., Columbia, S.C. 29204

[21] Appl. No.: 137,277

[22] Filed: Apr. 4, 1980

[51] Int. Cl.³ .......................... B32B 3/14; E04B 2/00; E04C 2/34; B65D 90/04
[52] U.S. Cl. ....................................... 428/74; 428/75; 428/76; 428/109; 428/113; 52/406; 52/805; 52/809; 220/431; 220/432; 220/452; 220/469
[58] Field of Search ....................... 428/69, 74, 75, 76, 428/109, 113; 52/406, 805, 809; 270/422, 426, 431, 432, 450, 452, 461, 469

[56] References Cited

U.S. PATENT DOCUMENTS

| | | | |
|---|---|---|---|
| 1,969,621 | 4/1934 | Munters | 428/69 |
| 2,779,066 | 1/1957 | Gaugler | 428/69 |
| 2,781,287 | 2/1957 | Gustus et al. | 428/109 |
| 2,939,811 | 6/1960 | Dillon | 428/69 |
| 3,004,877 | 10/1961 | Simms | 428/69 |
| 3,264,165 | 8/1966 | Stickel | 428/69 |
| 3,445,319 | 5/1969 | Dawbarn | 428/109 |
| 3,836,417 | 9/1974 | Yaeger | 428/69 |

Primary Examiner—William R. Dixon, Jr.
Attorney, Agent, or Firm—Brumbaugh, Graves, Donohue & Raymond

[57] ABSTRACT

Insulation material includes a fibrous material and a low conductivity gas sealed within a casing made from one or more heat sealable laminate sheets. The fibrous material is partially secured to the inner surface of the casing with adhesive means. The laminate sheets each comprise at least two thermoplastic films reinforced longitudinally with glass fibers comprising at least 2% by volume of the thermoplastic films. The films are bonded together orthogonally so as to produce a biaxially reinforced sheet. One or more ductile low conductivity abrasion resistant thin metallic films are deposited over substantially all of one or both sides of the biaxially reinforced sheets.

10 Claims, 2 Drawing Figures

LOW CONDUCTIVITY GAS SEALED BUILDING INSULATION

BACKGROUND OF THE INVENTION

The present invention is an improved insulation for use in the walls and ceilings of various enclosures, especially buildings. The heat loss by conduction through the walls and ceilings in home dwellings typically amounts to over 50 percent of the total heat required with the balance being lost through windows, doors, the floor, and air drafts. This loss through the walls is primarily limited by the space that is available for insulation and by the thermal conductivity of the insulating material.

Fluorocarbon gas filled fibrous insulations have been used to some advantage to insulate refrigerator walls. However, they have not been used to insulate buildings because the prior art does not include a low cost, low thermal conductivity, ultra low diffusion, fire resistant, durable casing for such insulation.

U.S. Pat. No. 1,969,621 discloses metal casings to provide the gas tight seal but with the disadvantage of high conductivity losses. U.S. Pat. Nos. 2,779,066; 2,939,811; and 3,004,877 disclose ultra low permeability thick polymeric and copolymeric films such as saran or polyvinylidene chloride and polyvinyl alcohol which have been used with moderate success for relatively short periods of time, perhaps a decade, but the cost of thick polymeric films is high for building insulation and the gas diffusion rate is too great for long-term applications, U.S. Pat. No. 3,264,165 shows that laminations of various types of polymers, paper, and metal films have been used with adequate success but at a prohibitive cost.

SUMMARY OF THE INVENTION

The present invention is an improved insulation which makes it possible to take advantage of the reduced thermal conductivity of dense gases with a minimum increase in cost and inconvenience, thereby making available a competitive building insulation with less than half the conductivity of current building insulations. The casing for the insulation of the present invention is durable and fire resistant and has a low cost, a low thermal conductivity, and ultra low diffusion properties.

The present invention is to some extent a simplification of U.S. Pat. No. 3,264,165 with improvements that result in reduced cost, improved ageing characteristics, and reduced thermal conductivity. It is designed to meet the requirements for building insulation. Several additional construction recommendations for reducing the heat losses in buildings are also suggested.

The thermal conductivity of the best insulating materials commonly used in construction is typically about 0.06 W/m°. About half of this comes from the thermal conductivity of air. The balance comes from convection and radiation within the insulation and from the conduction of the fibrous or cellular filler used to suppress radiation and convection. For example, glass has a thermal conductivity of about 1.4 W/m° C. and it is typically packed at 50 kg/m$^3$. It contributes significantly to the bulk thermal conductivity of the insulation, even though the fibers have essentially low conductivity point contacts, because the conductivity of the gas serves to increase the thermal contact between the fibers. Reducing the packing density will reduce this contribution but may increase convection and radiation losses, depending on the fiber diameter.

The dense fluorocarbon refrigerants have much lower thermal conductivities than air. For example, refrigerant 13Bl, $CBrF_3$, has a thermal conductivity of about 0.006 W/m° C. compared to 0.027 W/m° C. for air. However, the denser gases generally also have lower viscosities. This means that the distance between fibers must be decreased to prevent convection currents from becoming significant. Also, the number of scattering centers must be increased to reduce radiation losses. However, the bulk density of the packing must also be decreased to reduce its contribution to the bulk conductivity. Therefore, the fiber diameter must be reduced significantly if the benefits of a low thermal conductivity gas are to be totally realized. This point apparently has been overlooked in the prior art. Reducing the fiber diameter by about 30% and applying an adhesive layer to the inside surfaces of the casing to prevent settling of the fibers will assure that the convection losses are essentially eliminated with a fiber density of about 30 kg/m$^3$ for the recommended gas. $CBrF_3$, since its viscosity is not much less than that of air, and will provide a sufficient radiation barrier.

After dramatically reducing the losses through the insulation, the losses through the wood studs become very significant, and even the increase in thermal conductivity due to the use of aluminum or iron nails may be measurable. The thermal conductivity of the wood studs ranges from 0.18 W/m° C. to 0.22 W/m° C. They are typically 3.6 cm by about 8 cm or 14 cm with 36 cm of insulation space between them. The heat loss through the wood studs will amount to about 40% of the total loss through the walls and the use of aluminum nails on the exterior alone can increase this loss by several percent. However, if a strip of solid insulating material, made of the type of expanded polymeric foam commonly used in construction, is attached to the studs before the inner wall is put up and if low conductivity stainless steel nails are used throughout, this loss can easily be reduced to less than 20% of the total loss through the walls at a very small additional cost. These insulating strips on the studs will also greatly improve the acoustic insulation properties of the wall, will provide an additional dead air insulating space, and will lessen the chances of inadvertent puncture of the insulation by the home owner at a later time.

Finally, it should be pointed out that the reduced thermal conductivity of the insulation will not require more than a 5% decrease in the current carrying capacities of rubber insulated wires passing between two pieces of this insulation.

The present invention provides an insulation which demonstrates no significant leakage of the gas or infiltration of air or settling of the fibrous filler over a period of time as long as one century. The present invention provides that the heat losses through the casing of the insulation and any wall studs will be low and that the casing will be able to accommodate the change in volume of approximately 30% that accompanies the maximum changes in temperature and pressure that are likely to occur. The casing of the present invention is also tough and puncture resistant. The insulation of the present invention may be installed in a relatively simple manner and there are no significant health or fire hazards related to it. Finally, the cost of the insulation of the present invention is competitive.

Although it is recognized that there may be some restrictions in the applicability of the insulation of the present invention due to the fact that it cannot be shipped in long rolls and then cut to size at the building site, this drawback is compensated for by the reduction in hazards and annoyance associated with the handling of loose or matted fibrous insulation.

For a better understanding of the invention, reference is made to the following detailed description of a preferred embodiment, taken in conjunction with the drawings accompanying the application.

DETAILED DESCRIPTION OF THE PREFERRED EMBODIMENT

Figure 1:
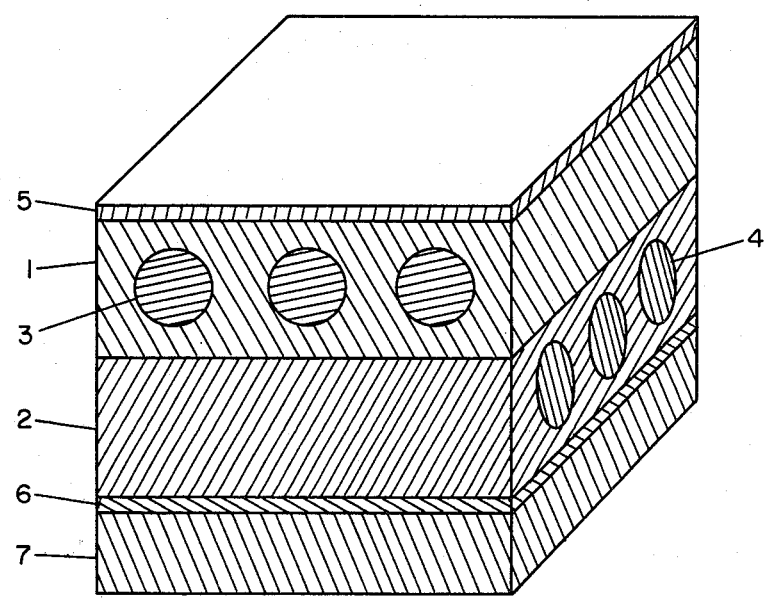
FIG. 1 is an enlarged cross section view of the biaxially reinforced sheet.

Referring to FIG. 1, two thermoplastic films 1 and 2 each about 0.02 mm thick are reinforced longitudinally with closely spaced glass fibers 3 and 4 about 0.015 mm in diameter. The films are bonded together orthognally into a biaxially reinforced sheet. About one micron of a stable, ductile, abrasion resistant, noncatalytic, low conductivity metal such as nickel or vanadium is deposited onto each side 5 and 6 of the reinforced sheet. An additional thermoplastic film 7 about 0.01 mm thick is bonded to the inner side of the casing to make the insulation casing laminate sheet heat sealable and to protect the metallic film.

Glass fibers 3 and 4 are recommended to reinforce the plastic films because of the importance of a high strength to cost ratio, low stretch and low thermal expansion, and moderately low thermal conductivity. These properties are essential to prevent ruptures in the metallic films and subsequent increases in gas diffusion and to minimize the thermal conductivity of the insulating bag. The glass fibers should comprise at least 2% and preferably at least 25% of the volume of the reinforced sheet.

The outer metallic film 5 serves to reduce the IR emmissivity of the surface to about 0.05, protects the plastic from UV radiation, ozone, and hydrocarbons that tend to cause aging, provides abrasion resistance, and serves as a diffusion barrier against atmospheric gases. The second metallic film 6 acts as a second gas barrier in the likely event that the first metallic film 5 is scratched. Nickel and vanadium are preferred over aluminum because of their low thermal conductivity, exceptional corrosion resistance, ultra low permeability, and high abrasion resistance. Furthermore, they are non-catalytic with chlorinated polymers such as PVC saran. Two vanadium films, each about one micron thick will provide an adequate gas seal for more than a century while increasing the thermal conductivity of the insulation by only 1%. It may be best to first vapor deposit or sputter a thin metallic film and then electroplate to the required thickness.

The materials selected for the plastic films must have low permeability, high strength and fatigue resistance, fire resistance, long term stability, and moderately low cost. They are not intended to provide an adequate gas seal in themselves as this would require sheets more than 1 cm thick, but rather they are intended to support and protect the thin metallic films and reduce the diffusion that will occur through pinholes and scratches in the metallic films. Crystallized saran is the best choice, except for the additional film that may be used over those exterior portions of the casing where additional abrasion protection is an advantage and the increased IR emmissivity is not a disadvantage—that is, the exterior of the sides 11 of FIG. 2. This additional film, if used, should be polyethlene filled with about 4% carbon black for stability and abrasion resistance.

Figure 2:
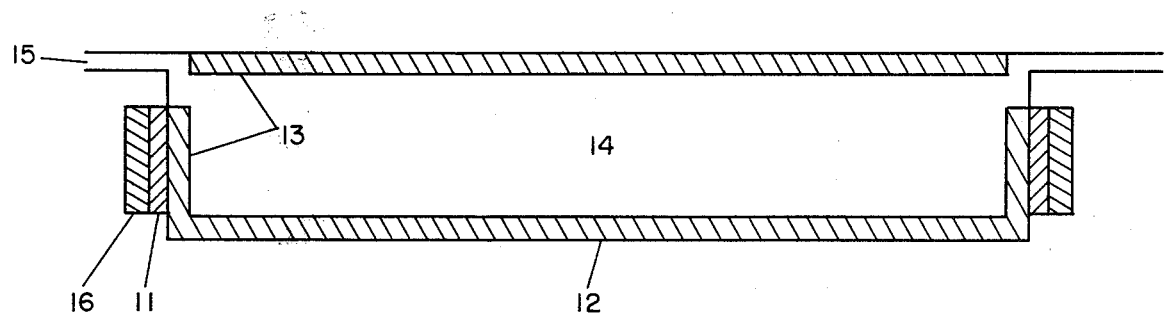
FIG. 2 is a cross section view of a sealed insulated bag.

Referring to FIG. 2, a cross section view of a preferred non-permeable insulation casing 12 made from two biaxially reinforced sheets is shown. The inner surfaces 12 are coated with an essentially non-volatile adhesive to prevent shifting and settling of the fibrous filler. The interior region 14 is filled with a low density (about 30 kg/m$^3$) fine glass wool (5 to 10 microns diameter) in an atmosphere of $CBrF_3$ at the maximum design operating temperature (about 50° C.) and minimum design atmospheric pressure (about 70 cm Hg). The use of long curled fibers is recommended for the filler rather than chopped fiber matts so as to reduce the internal abrasion and to permit lower packing densities.

The width of the insulation bag is determined by the distance between studs which is typically 36 cm. The thickness is determined by the stud size which is typically 8 cm or 14 cm. The upper edge seams 15 should extend about 3 cm to allow the insulation to be secured to the studs without breaking the seal. A cellular or fibrous mat 16 about 1 cm thick may be attached over the metallic films on the sides of the insulation bag with a suitable adhesive to reduce convection losses on the sides arising from imperfect fitting of the insulation casing between the studs.

The packages can be produced in a number of lengths that could be combined as needed to fit most applications—e.g. lengths of 0.25 m, 0.5 m, 1 m, 2 m, etc.—although insulating around electrical wiring may be particularly troublesome. This fitting problem could be reduced by a little forethought with regard to electrical wire routing and window positioning or by a change in wiring regulations allowing the wiring to be run in conduits immediately under the inner wall rather than midway between the walls when stud insulating strips are used to hold the inner wall off the studs. At any rate, miscellaneous spaces that cannot be readily filled with several prefabricated pieces of insulation could be filled with a conventional insulation.

To reduce the volume of the insulation for shipping purposes, it may be desirable to only partially fill the insulation with said gas at the factory and then to complete the fill at a local distribution facility. This would probably require first filling completely with said gas and assembling the package at the final desired thickness to assure uniform fiber density. Before completing the seals, the package could be compressed to perhaps 50 percent of the desired final thickness and then sealed. At the local facility, the remainder of the gas could be injected with a hollow needle (the type commonly used for hypodermic injections) connected to a regulator and compressed gas cylinder. The hole could be patched with a metallic adhesive patch. Since the fibers have been attached with an adhesive to both the upper and lower inner surfaces, the fully inflated package will still have a reasonably uniform distribution of fiber glass.

The invention has been shown with reference to a preferred embodiment thereof. Variations and modifications of the invention will be apparent to persons skilled in the art without departing from the inventive concepts disclosed herein. All such modifications and variations are intended to be within the scope of the present invention as defined in the following claims:

I claim:

1. Insulation material comprising fibrous material and a low conductivity gas sealed within a casing made from one or more heat sealable laminate sheets, wherein said fibrous material is partially secured to the inner surface of said casing with adhesive means, wherein said laminate sheets each comprise at least two thermoplastic films reinforced longitudinally with glass fibers comprising at least 2% by volume of said thermoplastic films, wherein said films are bonded together orthogonally so as to produce a biaxially reinforced sheet, and wherein one or more ductile low conductivity abrasion resistant thin metallic films are deposited over substantially all of one or both sides of said biaxially reinforced sheets.

2. Insulation material according to claim 1 wherein one or more thermoplastic films are laminated over part or all of said metallic films.

3. Insulation material according to claims 1 or 2 wherein a layer of additional insulation means covers part or all of the exterior surface of said casing.

4. Insulation material according to claim 1, wherein said gas is $CBrF_3$.

5. Insulation material according to claim 1, wherein said thin metallic films are comprised of vanadium.

6. Insulation material according to claim 1, wherein said thin metallic films are comprised of nickel.

7. Insulation material according to claim 1, wherein said fibrous material is glass wool having a diameter of from 5 to 10 microns.

8. Insulation material according to claims 1 or 2, wherein said thermoplastic films are comprised of crystallized saran.

9. Insulation material according to claim 1, wherein said fibrous material has a fiber density of not more than 30 kg/m$^3$ in said gas.

10. Insulation material comprising glass wool having a diameter of from 5 to 10 microns and $CBrF_3$ sealed within a casing made from one or more heat sealable laminate sheets wherein said glass wool is partially secured to the inner surface of said casing with adhesive means, wherein said laminate sheets are comprised of crystallized saran and each comprises at least two thermoplastic films reinforced longitudinally with glass fibers comprising at least 25% by volume of said thermoplastic films, wherein said films are bonded together orthogonally so as to produce a biaxially reinforced sheet, and wherein one or more ductile, low conductivity, abrasion resistant thin metallic films selected from the group consisting of vanadium and nickel are deposited over substantially all of one or both sides of said biaxially reinforced sheets.

* * * * *